United States Patent [19]

Heintz

[11] Patent Number: 4,678,066

[45] Date of Patent: Jul. 7, 1987

[54] VIBRATION DAMPENER

[76] Inventor: Robert J. Heintz, Box 891, Royal Oak, Mich. 48068

[21] Appl. No.: 770,765

[22] Filed: Aug. 29, 1985

[51] Int. Cl.⁴ ............................................ F16F 15/12
[52] U.S. Cl. .................................. 188/218 A; 29/450; 74/574; 188/379
[58] Field of Search ............ 188/218 A, 218 XL, 379; 24/298, 299, 300, 301, 302, 282, 284; 74/574; 403/41, 60, 78, 118, 223; 301/6 WB; 410/97, 100; 29/450; 267/69, 74; 2/339; 152/217, 218, 219, 232, 233

[56] References Cited

U.S. PATENT DOCUMENTS

| 38,245 | 4/1863 | Seely | 267/74 |
|---|---|---|---|
| 3,334,886 | 8/1967 | Caunt | 74/574 X |
| 3,374,308 | 3/1968 | Haas | 2/339 X |
| 4,043,431 | 8/1977 | Ellege | 188/218 A X |

FOREIGN PATENT DOCUMENTS 523757  8/1921  France ................................ 403/223

Primary Examiner—Duane A. Reger
Attorney, Agent, or Firm—Barnes, Kisselle, Raisch, Choate, Whittemore & Hulbert

[57] ABSTRACT

A vibration dampener for dampening vibration in a brake rotor comprising two elongated, flexible, stretchable, tubular members, one of which is shorter than the other. Weights are attached to the two members. Links connect the two members end-to-end in a closed loop capable of being stretched over the periphery of a relatively large diameter brake rotor. The links are releasable so that the shorter tubular member may be removed and the ends of the longer tubular member connected together in a closed loop capable of being stretched over the periphery of a smaller diameter brake rotor.

3 Claims, 4 Drawing Figures

VIBRATION DAMPENER

This invention relates generally to vibration dampeners and refers more particularly to a vibration dampener for dampening vibration in a brake rotor during resurfacing.

BACKGROUND AND SUMMARY OF THE INVENTION

During resurfacing, it is customary to apply a dampening device to a brake rotor to suppress or eliminate vibration which would otherwise cause chatter and thus interfere with the resurfacing operation.

U.S. Pat. No. 4,043,431 discloses a vibration dampener in which a plurality of weights are carried by a single elastic band. The weights are in the form of cylindrical sections sleeved on the band and the ends of the band are connected together to form a closed loop which can be stretched over the periphery of the brake rotor.

The vibration dampener of the present invention is designed so that it may be used in connection with brake rotors of widely differing diameters. The vibration dampener comprises two elongated flexible and stretchable members, one of which is shorter than the other. Weights are carried by the members. Means are provided for connecting the members together end-to-end in a closed loop capable of being stretched over the periphery of a relatively large diameter brake rotor. The connecting means is releasable so that the shorter member may be removed and the ends of the larger member connected together in a closed loop capable of being stretched over the periphery of a smaller diameter brake rotor. The vibration dampener may be used in connection with both vented and non-vented rotors.

These and other objects of the invention will become apparent as the following description proceeds especially when considered in conjunction with the accompanying drawings.

DETAIL DESCRIPTION

Figure 1:
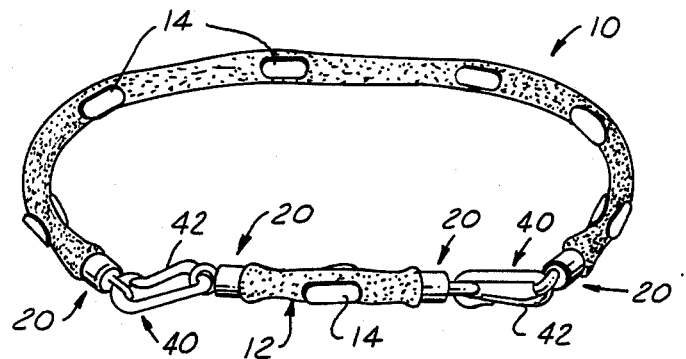
FIG. 1 is a perspective view of a vibration dampener constructed in accordance with my invention, shown formed into closed loop suitable for being stretched over the periphery of a brake rotor.
Figure 2:
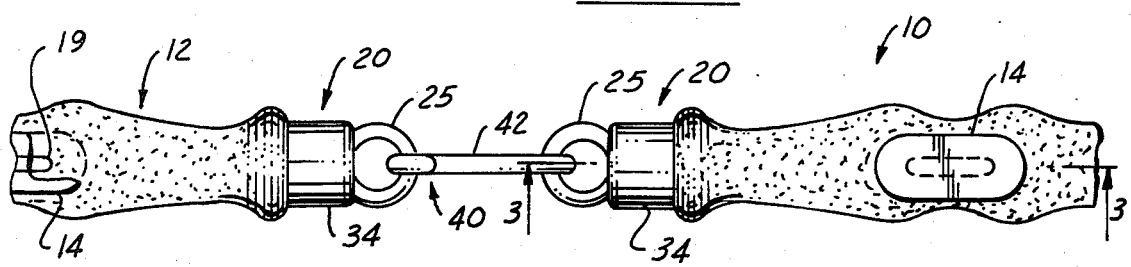
FIG. 2 is an enlarged fragmentary elevational view of a portion of the vibration dampener shown in FIG. 1.
Figure 3:
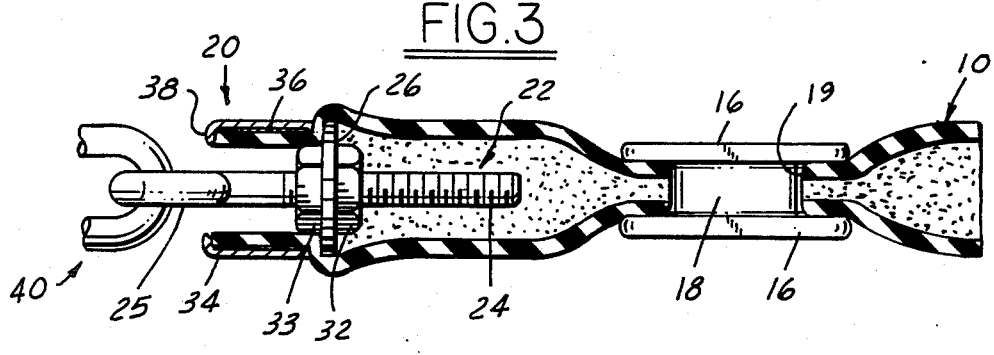
FIG. 3 is a sectional view taken on the line 3—3 in FIG. 2.

Referring now more particularly to the drawings, the vibration dampener comprises two elongated, flexible, stretchable tubular members 10 and 12, the member 12 being shorter than the member 10. Both members are made of a length of suitable elastic material such, for example, as gum rubber or surgical tubing.

Weights 14 are provided for the members 10 and 12. Several weights are distributed along the length of the longer member 10 in roughly equally spaced relation. Only a single weight is provided for the much shorter member 12 although more may be provided if desired. The weights may be made of lead or any suitable relatively heavy material. The weights may be of any suitable construction, but in the present instance each weight is shown as comprising spaced parallel plates 16 connected by a narrow web 18. Each weight 14 is attached to one of the members 10, 12 with the plates on opposite sides of the member and the web extending through a slot 19 in the wall of the member. The tubing material of which the members 10 and 12 is made is very elastic and may be stretched to enlarge a slot sufficiently to allow one plate of a weight to be inserted through the enlarged slot. When tension on the tubing is released, the slot will return to its normal size and keep the weight attached.

There is a connector assembly 20 at each end of each tubular member. The connector assemblies may be of any suitable construction and a number of different designs would serve the purpose. However, I have found that connector assemblies of the type herein shown and described are particularly well suited. Such connector assemblies each include an eye bolt 22 the threaded shank 24 of which extends inside the tubing and the eye 25 of which is disposed outside or beyond the end of the tubing. There is a washer 26 on the shank of the eye bolt. The washer is larger in diameter than the inside of the tubing in its relaxed or free state condition and, therefore, expands the tubing. Nuts 32 and 33 are threaded on the shank 24 of the eye bolt on either side of the washer 26. These nuts have the usual flats around the outside and have a maximum outside diameter approximating the inside diameter of the tubing in its normal relaxed or free state condition. A thread locking material may be applied between the threads of the nuts and the eye bolt to prevent loosening so the bolt will not unthread out of the nuts.

Each connector assembly also has a cap 34 sleeved over the end portion of the tubing. An adhesive 36 may be provided between the cap and tubing, but in many cases the adhesive has been found to be unnecessary, The cap has an inturned annular flange 38 extending across the end of the tubing. The cap 34 is spaced radially outwardly from the nut 33 by about the thickness of the tubing wall. The inside diameter of the cap is less than the diameter of the washer 26. The washer 26 is located inwardly of the cap 34 so that the washer 26 and cap 34 cooperate in preventing the eye bolt from pulling out of the tubing.

The tubular members 10 and 12 are connected together end-to-end to form a closed loop by releasable links 40. Links 40 are elongated clips with return-bent ends, having a flexible prong 42 attached to one end and releasably engageable under the other to close the link. One link 40 passes through the eye 25 of the connector assembly at one end of tubular member 10 and also through the eye 25 of the connector assembly at one end of the tubular member 12. The other link 40 passes through the eyes 25 of the connector assemblies at the other ends of the tubular members 10 and 12.

Figure 4:
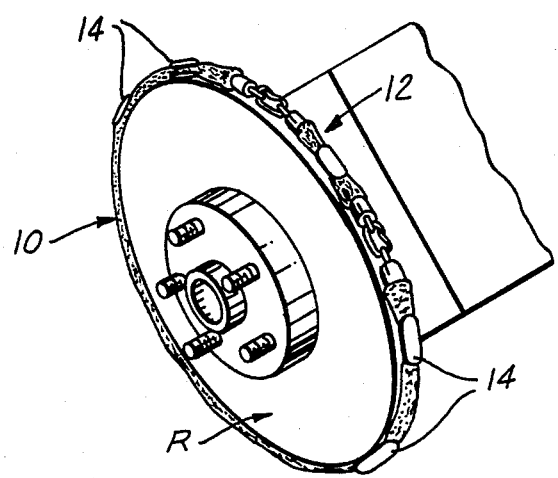
FIG. 4 is a perspective view showing the vibration dampener stretched over the periphery of a brake rotor.

When assembled in a closed loop as in FIG. 1, the vibration dampener can be used to dampen vibrations incident to resurfacing of a brake rotor having a larger diameter than the vibration dampener in its unstretched, relaxed or free state condition. The vibration dampener is simply stretched over the periphery of the rotor, such as rotor R in FIG. 4, and it will cling to the rotor periphery by virtue of its being in a stretched condition. With the vibration dampener thus applied, the rotor may be rotated and the opposite surfaces smoothly refinished by a conventional cutting tool.

When it is desired to resurface a brake rotor having a diameter less than that of the unstretched loop formed by the two tubular members 10 and 12 in FIG. 1, the links 40 are opened and the shorter tubular member 12 is removed. Then the ends of the longer tubular member 10 are connected together by one of the links 40 passing through the eyes 25 of the connector assemblies at the two ends, forming a smaller loop. The resulting smaller loop dampener is then stretched over the smaller diameter brake rotor which may then be resurfaced in the same manner as already described.

Although I have shown the dampener of my invention applied to a typical vented brake rotor, it will be understood that the principal of the invention also applies to the narrower non-vented rotors, as well.

I claim:

1. A vibration dampener for dampening vibration in a brake rotor during resurfacing, comprising a first elongated flexible and stretchable member, a second elongated flexible and stretchable member which is shorter than the first, weights carried by said members, and means for connecting said members together end-to-end in a closed loop capable of being stretched over the periphery of a relatively large diameter brake rotor, said connecting means being releasable so that said second member may be removed and the ends of said first member connected together in a closed loop capable of being stretched over the periphery of a smaller diameter brake rotor, said members being tubular and said connecting means comprising a connector assembly for each end portion of each member, each connector assembly comprising a cap sleeved on an end portion, and an eye-bolt having a eye outside said end portion and a shank extending into said end portion beyond said cap to a point where it has an enlargement of sufficient diameter to radially stretch said end portion, said cap having an inside diameter smaller than said enlargement and cooperating with said enlargement to prevent said eye-bolt from pulling out of said end portion.

2. A vibration dampener as defined in claim 1, including a releasable link connecting the eye of each eye-bolt to that of another.

3. A vibration dampener for dampening vibration in a brake rotor during resurfacing, comprising a first elongated flexible and stretchable member, a second elongated flexible and stretchable member which is shorter than the first, weights carried by said members, each member having a first end and a second end, first connecting means connecting the first end of said first member to the first end of said second member, second connecting means connecting the second end of said first member to the second end of said second member, said first and second connecting means connecting said members together end-to-end in a closed loop capable of being stretched over the periphery of a relatively large diameter brake rotor, said first and second connecting means each being releasable so that said second member may be removed and the ends of said first member connected together in a closed loop capable of being stretched over the periphery of a smaller diameter brake rotor.

* * * * *